United States Patent
Xue et al.

(10) Patent No.: US 6,306,208 B2
(45) Date of Patent: Oct. 23, 2001

(54) LOW TEMPERATURE BURNOUT SCREEN PRINTING FRIT VEHICLE

(75) Inventors: Liang A. Xue; James Piascik, both of Randolph, NJ (US)

(73) Assignee: AlliedSignal, Inc., Morris Township, NJ (US)

(*) Notice: Subject to any disclaimer, the term of this patent is extended or adjusted under 35 U.S.C. 154(b) by 0 days.

(21) Appl. No.: 09/792,921

(22) Filed: Feb. 26, 2001

Related U.S. Application Data

(62) Division of application No. 09/323,459, filed on Jun. 1, 1999, now Pat. No. 6,248,680.

(51) Int. Cl.$^7$ .............................. C09D 101/18; C08L 1/18
(52) U.S. Cl. ......................................................... 106/169.28
(58) Field of Search .......................................... 106/169.28

(56) References Cited

U.S. PATENT DOCUMENTS

| | | | |
|---|---|---|---|
| 3,966,449 | * | 6/1976 | Foster et al. .............................. 65/43 |
| 4,456,549 | | 6/1984 | Kano et al. . |
| 4,460,622 | * | 7/1984 | Yamaoka et al. ....................... 427/79 |
| 4,567,059 | | 1/1986 | Yamaoka et al. . |
| 4,612,433 | | 9/1986 | Nagaoka et al. . |
| 4,880,665 | | 11/1989 | Adler et al. . |
| 5,242,867 | | 9/1993 | Lin et al. . |
| 5,443,786 | | 8/1995 | Yokoyama et al. . |
| 5,691,254 | | 11/1997 | Sakamoto et al. . |
| 5,702,996 | * | 12/1997 | Kawakami et al. .................... 501/14 |
| 5,766,741 | | 6/1998 | Kawakami et al. . |
| 5,801,108 | | 9/1998 | Huang et al. . |
| 5,840,107 | * | 11/1998 | Salibay ............................... 106/180.1 |
| 6,248,680 | * | 6/2001 | Xue et al. .............................. 501/15 |

FOREIGN PATENT DOCUMENTS

| | | | |
|---|---|---|---|
| 0092601 | * | 11/1983 | (EP) .............................. C23C/17/00 |
| 60137848 | | 7/1985 | (JP) . |

OTHER PUBLICATIONS

International Search Report dated Sep. 15, 2000.

* cited by examiner

*Primary Examiner*—David Brunsman
(74) *Attorney, Agent, or Firm*—Keith Newburry, Esq.

(57) ABSTRACT

A method for making a glass frit paste is provided. First, nitrocellulose is dissolved in a high vapor pressure solvent of the nitrocellulose to make a solution. A portion of the solution is then mixed with alpha-terpineol to form a vehicle. Glass frit is mixed with the vehicle and then ground to form the paste. During the grinding step most of the high vapor pressure solvent evaporates. The resulting paste has a composition comprising about 0.3–12.0 wt. % nitrocellulose, about 0.5–2.0 wt. % of a high vapor pressure solvent of said nitrocellulose, about 14.0–25.0 wt. % alpha-terpineol, and the remainder glass frit.

9 Claims, No Drawings

LOW TEMPERATURE BURNOUT SCREEN PRINTING FRIT VEHICLE

CROSS-REFERENCE TO RELATED APPLICATION(S)

This application is a divisional of U.S. patent application Ser. No. 09/323,459, filed Jun. 1, 1999 now U.S. Pat. No. 6,248,680.

TECHNICAL FIELD

This invention relates generally to sealing compositions and in particular to vehicles and pastes for use in the screen printing of glass frit.

BACKGROUND OF THE INVENTION

Bernot et al, U.S. patent application Ser. No. 08/986,253, filed Dec. 5, 1997, now U.S. Pat. No. 6,058,780 entitled, (as amended), "Capacitive Pressure Sensor Housing Having a Ceramic Base" which is assigned to the assignee of this application, discloses a glass ceramic capsule comprised of a cover and a header also referred to as a base that together define an interior chamber. A capacitive pressure sensor is mounted within the chamber. The header is ceramic while the cover is either ceramic or metallic. The cover and header are sealed together with glass frit.

Typically, the glass frit is made into a paste using a vehicle which is a combination of a solvent and a binder. The paste is then applied onto the surfaces to be bonded by either brushing or ink-jetting. A critical requirement for the vehicle is that it have a low temperature burnout capability. It needs to completely burn out before the glass frit softens (i.e. melts) which occurs at about 350° C. (662° F.). One vehicle currently used is amyl-acetate (a solvent) containing a small amount of nitrocellulose (a binder). This vehicle meets the temperature requirement because the nitrocellulose burns out well below 350° C. (662° F.).

A disadvantage to the brushing or ink-jetting methods is that with these methods it is difficult to control the thickness and uniformity of the glass frit as it is applied. Using a screen-printing method to apply the glass frit paste would provide both performance and cost advantage over these other methods because the screen printing method produces a more uniform frit coating layer with easily controlled thickness and can be economically applied in large scale batch production. However, the current vehicle of amyl-acetate and nitrocellulose is not suitable for a screen-printing method because the evaporation rate of amyl-acetate is too fast creating an unstable paste whose thickness is difficult to control. Further, other commercially available screen-printing vehicles do not burn out completely at temperatures below 350° C. (662° F.).

Accordingly, there is a need for a low-evaporation rate, low temperature burnout vehicle that can be used in the formation of a glass frit paste that can be used in a screen printing process.

SUMMARY OF THE INVENTION

An object of the present invention is to provide a glass frit paste that can be used in a screen printing process and a method for making the paste.

Another object of the present invention is to provide a vehicle that can be used in the formation of the glass frit paste and a method for making such a vehicle.

To make the glass frit paste nitrocellulose is dissolved in a high vapor pressure solvent of the nitrocellulose to make a solution. A portion of the solution is then mixed with alpha-terpineol to form a vehicle. Glass frit is mixed with the vehicle and then ground to form the paste. During the grinding step most of the high vapor pressure solvent evaporates. The resulting paste has a composition comprising about 0.3–12.0 wt. % nitrocellulose, about 0.5–2.0 wt. % of a high vapor pressure solvent of said nitrocellulose, about 14.0–25.0 wt. % alpha-terpineol, and the remainder glass frit.

These and other objects, features and advantages of the present invention are specifically set forth in or will become apparent from the following detailed description of a preferred embodiment of the invention.

DESCRIPTION OF THE PREFERRED EMBODIMENTS

A vehicle for use in a screen printing method in applying a glass frit paste comprises alpha-terpineol, nitrocellulose and a solvent of nitrocellulose, such as amyl-acetate or ethylene glycol monoethyl ether. The solvent is transitional in that it mostly evaporates during the paste making process where the vehicle is mixed with glass frit. The use of the solvent is nonetheless essential because the binder, nitrocellulose, does not dissolve in alpha-terpineol. Due to its low-evaporation rate, the resulting paste is stable in open air and suitable for screen-printing. The vehicle burns out at temperatures below 300° C. (572° F.).

The process to make the vehicle and paste consists of the following steps which preferably occur at room temperature and pressure. First nitrocellulose is dissolved in a high vapor pressure solvent such as amyl-acetate or ethylene glycol monoethyl ether to make a solution. The nitrocellulose preferably constitutes 1 to 15 wt. % of the solution. Next, the solution is mixed with alpha-terpineol. The ratio of solution to alpha-terpineol can range from 1 part solution to five parts alpha-terpineol to 6 parts solution to 1 part alpha-terpineol. The mixing of solution and alpha-terpineol forms the vehicle. The vehicle is then mixed and ground with a glass frit at a ratio that ranges from 2 parts vehicle to 1 part frit to 1 part vehicle to 8 parts frit. A dispersing agent may also be added at this point in the process. The result is the paste. In the preferred embodiment the paste is comprised of about 0.1–18.0 wt. % nitrocellulose; about 0.0–3.0 wt. % of a high vapor pressure solvent; about 8.0–40.0 wt. % alpha-terpineol; and the remainder glass frit In a more preferred embodiment the paste is comprised of about 0.3–12.0 wt. % nitrocellulose; about 0.5–1.9 wt. % of a high vapor pressure solvent; about 14.0–25.0 wt. % alpha-terpineol; and the remainder glass frit. The particular glass frit used is selected to match the expansion properties of the components that are to be sealed together. Examples of such frits are lead borosilicate, copper aluminoborate, lead aluminosilicate, lead zinc borate, zinc borosilicate, zinc bismuthsilicate, alkali zincsilicate, alkali titaniumsilicate and the like. During the mixing and grinding process, the high vapor pressure solvent, (amyl-acetate or ethylene glycol monoethyl ether), mostly evaporates, that is less than 3 wt. % of the solvent is left in the paste after the process is complete.

Examples of the vehicle and paste are set forth below.

EXAMPLE 1

1.90 grams nitrocellulose was dissolved in 51.23 grams amyl acetate to make an amyl acetate solution containing about 3.7 wt,% nitrocellulose. The solution was then mixed with 130.45 grams alpha-terpineol which is a ratio of about 1:2.5 to make the vehicle. 21.8 grams of this vehicle was mixed with 65.0 grams of Corning #2366 glass frit which is a ratio of about 1:4 in a mortar grinder to make a paste to be used in a screen printing process. 4 drops of tridecyl acid phosphate was also added as a dispersing agent. During the mixing/grinding process most of the amyl acetate evaporates. The final paste is composed of about 0.3 wt. % nitrocellulose, 1.2 wt. % amyl acetate, 19.0 wt. % alpha-terpineol, and 79.5 wt. % glass frit.

EXAMPLE 2

9.86 grams nitrocellulose was dissolved in 161.52 grams amyl acetate to make an amyl acetate solution containing about 5.8 wt. % nitrocellulose. A portion (120.40 grams) of the solution was then mixed with 286.27 grams alpha-terpineol which is a ratio of about 1:2.4 to make the vehicle. 65.42 grams of this vehicle together with an additional 8.19 grams alpha-terpineol were mixed with 186.69 grams of SEM-COM B-10023 glass frit in a mortar grinder to make the paste. The ratio of vehicle to frit of about 1:2.5. 3 drops of tridecyl acid phosphate was also added as a dispersing agent. During the mixing/grinding process most of the amyl acetate evaporates. The final paste is composed of about 0.5 wt. % nitrocellulose, 0.8 wt. % amyl acetate, 22.2 wt. % alpha-terpineol, and 76.5 wt. % the glass frit.

EXAMPLE 3

28.8 grams nitrocellulose was dissolved in 410.3 grams amyl acetate to make an amyl acetate solution containing about 7.0 wt. % nitrocellulose. The solution was then mixed with 481.6 grams alpha-terpineol which is at a ratio of about 1:1.1 to make the vehicle. 34.0 grams of this vehicle together with an additional 8.0 grams alpha-terpineol were mixed with 150.0 grams of SEM-COM B-10050 glass frit in a mortar grinder to make the paste. The vehicle to frit ratio of this example being about 1:3.6. 3 drops of tridecyl acid phosphate was also added as a dispersing agent. During the mixing/grinding process most of the amyl acetate evaporates. The final paste is composed of about 0.6 wt. % nitrocellulose, 0.5 wt. % amyl acetate, 14.5 wt. % alpha-terpineol, and 84.4 wt. % the glass frit.

EXAMPLE 4

2.13 grams nitrocellulose was dissolved in 62.36 grams ethylene glycol monoethyl ether to make an ethylene glycol monoethyl ether solution containing about 3.3 wt. % nitrocellulose. A portion (15.87 grams) of the solution was then mixed with 29.94 grams alpha-terpineol which is a ratio of about 1:1.9 to make the vehicle. It was then mixed with 93.0 grams of Corning #2366 glass frit, a ratio of about 1:2, in a mortar grinder to make the paste. During the mixing/grinding process most of the ethylene glycol monoethyl ether evaporates. The final paste is composed of about 0.4 wt. % nitrocellulose. 0.8 wt. % ethylene glycol monoether 24.0 wt. % alpha-terpineol, and 74.8 wt. % the glass frit.

EXAMPLE 5

11.5 gram nitrocellulose was dissolved in 98.5 grams amyl acetate to make an amyl acetate solution containing about 10.5 wt. % nitrocellulose. The solution was then mixed with 20.0 grams alpha-terpineol, a ratio of about 5.5:1, to make the vehicle. It was then mixed with 70.0 grams of SEM-COM B-10050 glass frit which is a ratio of about 1.9:1 in a mortar grinder to make the paste. During the mixing/grinding process most of the amyl acetate evaporates. The final paste is composed of about 11.1 wt. % nitrocellulose, 1.9 wt. % amyl acetate, 19.3 wt. % alpha-terpineol, and 67.6 wt. % the glass frit.

Thus a glass frit paste is provided that can be used in a screen printing process resulting in a more uniform frit coating layer with easily controlled thickness. A vehicle used in the formation of this paste is also provided. The vehicle having a low temperature burnout capability below the melting temperature of the glass frit.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A composition comprising:

nitrocellulose in an amount ranging from about 0.1 to about 13.0 wt % based on the total weight of the composition;

at least one high vapor pressure solvent of nitrocellulose in a total amount ranging from about 14.0 to about 85.0 wt % based on the total weight of the composition; and alpha-terpineol.

2. A composition according to claim 1, wherein the solvent is amyl-acetate.

3. A composition according to claim 1, wherein the solvent is ethylene glycol monoethyl ether.

4. A composition according to claim 1, wherein the composition consists essentially of:

nitrocellulose in an amount ranging from about 0.1 to about 13.0 wt % based on the total weight of the composition;

at least one high vapor pressure solvent of nitrocellulose in a total amount ranging from about 14.0 to about 85.0 wt % based on the total weight of the composition; and alpha-terpineol.

5. A composition according to claim 4, wherein the solvent is amyl-acetate.

6. A composition according to claim 4, wherein the solvent is ethylene glycol monoethyl ether.

7. A vehicle for using in making a glass frit paste for use in a screen printing process comprising:

about 0.1–13.0 wt. % nitrocellulose;

about 14.0–85.0 wt. % of a high vapor pressure solvent of said nitrocellulose;

and the remainder alpha-terpineol.

8. The vehicle of claim 7 wherein said solvent is amyl-acetate.

9. The vehicle of claim 7 wherein said solvent is ethylene glycol monoethyl ether.

* * * * *